US012782741B2

(12) United States Patent
Kim et al.

(10) Patent No.: US 12,782,741 B2
(45) Date of Patent: Nov. 3, 2026

(54) AR DEVICE AND METHOD FOR PREVENTING GLARE IN AR SERVICE IMAGE

(71) Applicant: Samsung Electronics Co., Ltd., Suwon-si (KR)

(72) Inventors: Seonghun Kim, Suwon-si (KR); Kwangtaek Woo, Suwon-si (KR); Mingyu Kim, Suwon-si (KR); Jinwan An, Suwon-si (KR); Jaeho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/357,555

(22) Filed: Oct. 14, 2025

(65) Prior Publication Data

US 2026/0036818 A1 Feb. 5, 2026

Related U.S. Application Data

(63) Continuation of application No. PCT/KR2024/095694, filed on Apr. 11, 2024.

(30) Foreign Application Priority Data

Apr. 17, 2023 (KR) ........................ 10-2023-0050195
May 26, 2023 (KR) ........................ 10-2023-0068504

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/013* (2013.01); *G06V 10/26* (2022.01);
(Continued)

(58) Field of Classification Search
CPC ................ G06F 3/013; G02B 27/0172; G02B 2027/012; G02B 2027/0138;
(Continued)

(56) References Cited

U.S. PATENT DOCUMENTS 10,210,670 B2 2/2019 Yamazaki
11,211,030 B2 12/2021 Bonnier et al.
(Continued)

FOREIGN PATENT DOCUMENTS

CN 115309021 A 11/2022
EP 4 156 083 A1 3/2023
(Continued)

OTHER PUBLICATIONS

Jae Ryong Han, Does the sun affect the eyes this much?, Hallym University Dongtan Sacred Heart Hospital, Sep. 12, 2012 https://m.health.chosun.com/column/column_view.jsp?idx=7191.
(Continued)

*Primary Examiner* — Lisa S Landis
(74) *Attorney, Agent, or Firm* — Jefferson IP Law, LLP

(57) ABSTRACT

An electronic device is provided. The electronic device is configured to acquire a captured image from a camera of the electronic device, identify a total quantity of light in an external environment through an illuminance sensor, recognize objects included in the captured image, determine a quantity of light for each of the recognized objects based on the overall total quantity of light in the captured image and color information of the captured image acquired through the camera, recognize a target object corresponding to a user gaze direction among objects included in the acquired captured image, output, through a transparent member and a display, a first AR service image including at least one virtual object of which at least a portion overlaps the image in associated with the recognized target object, and display,
(Continued)

through the display, a second AR service image having the a reduced transmittance in at least a partial area of a transparent member corresponding to the a first object at locations of both eyes of the user, when a first object recognized as being in a glare state, exceeding a reference value, is present among objects located at a preset distance from the target object and/or the virtual object by comparing the quantity of light of the target object, the virtual object, and the objects recognized in the image.

19 Claims, 7 Drawing Sheets

(51) Int. Cl.

| | |
|---|---|
| ***G06V 10/26*** | (2022.01) |
| ***G06V 10/60*** | (2022.01) |
| ***G06V 10/94*** | (2022.01) |
| ***G06V 10/98*** | (2022.01) |
| ***G06V 20/20*** | (2022.01) |
| *G06V 10/764* | (2022.01) |

(52) U.S. Cl.
CPC ............ *G06V 10/60* (2022.01); *G06V 10/945* (2022.01); *G06V 10/993* (2022.01); *G06V 20/20* (2022.01); *G02B 2027/012* (2013.01); *G02B 2027/0138* (2013.01); *G02B 2027/014* (2013.01); *G02B 2027/0178* (2013.01); *G06V 10/764* (2022.01)

(58) Field of Classification Search
CPC ...... G02B 2027/014; G02B 2027/0178; G06V 20/20; G06V 10/60; G06V 10/26; G06V 10/933; G06V 10/945; G06V 10/764
See application file for complete search history.

(56) References Cited

U.S. PATENT DOCUMENTS

| | | | | |
|---|---|---|---|---|
| 11,869,395 | B2 | 1/2024 | Kim et al. | |
| 2016/0223816 | A1 | 8/2016 | Hue et al. | |
| 2018/0180890 | A1 | 6/2018 | Baerenrodt et al. | |
| 2020/0065596 | A1 | 2/2020 | Maeng et al. | |
| 2020/0111259 | A1 * | 4/2020 | Sears | G02B 27/0172 |
| 2021/0191319 | A1 | 6/2021 | Christmas | |
| 2021/0318538 | A1 | 10/2021 | Beckman | |
| 2022/0197377 | A1 * | 6/2022 | Kim | G06V 40/18 |
| 2023/0120187 | A1 | 4/2023 | Uhm et al. | |

FOREIGN PATENT DOCUMENTS

| | | | |
|---|---|---|---|
| EP | 3 559 728 | B1 | 2/2025 |
| KR | 10-2012-0057708 | A | 6/2012 |
| KR | 10-2016-0069034 | A | 6/2016 |
| KR | 10-2019-0104922 | A | 9/2019 |
| KR | 10-2022-0074648 | A | 6/2022 |
| KR | 10-2022-0091160 | A | 6/2022 |

OTHER PUBLICATIONS

Bjorn Lofving et al., Visualization of disability glare due to veiling luminance, 6th International Building Physics Conference, IBPC 2015 https://www.sciencedirect.com/science/article/pii/S1876610215018160.
International Search Report dated Jul. 3, 2024, issued in International Application No. PCT/KR2024/095694.

* cited by examiner (501)

(502)

AR DEVICE AND METHOD FOR PREVENTING GLARE IN AR SERVICE IMAGE

CROSS-REFERENCE TO RELATED APPLICATION(S)

This application is a continuation application, claiming priority under 35 U.S.C. § 365(c), of an International application No. PCT/KR2024/095694, filed on Apr. 11, 2024, which is based on and claims the benefit of a Korean patent application number 10-2023-0050195, filed on Apr. 17, 2023, in the Korean Intellectual Property Office, and of a Korean patent application number 10-2023-0068504, filed on May 26, 2023, in the Korean Intellectual Property Office, the disclosure of each of which is incorporated by reference herein in its entirety.

BACKGROUND

1. Field

The disclosure relates to an augmented reality (AR) device and a method of preventing glare in an AR service image.

2. Description of Related Art

Currently, electronic devices (hereinafter, AR device) for supporting augmented reality (AR) or mixed reality (MR) services that provide information by superimposing a virtual image on an image or background of the real world (real-world elements) are rapidly increasing.

The AR device may include an optical see-through (OST) type configured to allow external light to reach a user's eye through glass when the user wears an electronic device or a video see-through (VST) type configured to, when worn, allow light emitted from a display to reach the user's eye and to block the external light from reaching the user's eye.

Since the AR device provides a real-world environment to the user, the range of change in brightness perceived by a human may be very large in an AR service environment. Regarding brightness issues in the AR service environment, the user wearing the AR device may experience the glare phenomenon that makes it difficult to recognize a visual target due to a high-luminance light source in close proximity to the user gaze.

The above information is presented as background information only to assist with an understanding of the disclosure. No determination has been made, and no assertion is made, as to whether any of the above might be applicable as prior art with regard to the disclosure.

SUMMARY

Aspects of the disclosure are address at least the above-mentioned problems and/or disadvantages and to provide at least the advantages described below. Accordingly, an aspect of the disclosure is to provide a method capable of preventing the visual shielding phenomenon caused due to occurrence of glare in an augmented reality (AR) service environment of recognizing an object (e.g., target object) suitable for the intent of a user and outputting a virtual object corresponding to the recognized object.

Additional aspects will be set forth in part in the description which follows and, in part, will be apparent from the description, or may be learned by practice of the presented embodiments.

In accordance with an aspect of the disclosure, an electronic device (e.g., augmented reality (AR) device) is provided. The electronic device includes a frame, a transparent member configured to be supported by the frame, a display configured to output visual information to the transparent member, a camera provided to the frame, an illuminance sensor, memory, comprising one or more storage media, storing instructions, one or more processors communicatively coupled to the memory, display, the camera, and the illuminance sensor, wherein the instructions may, when executed by the one or more processors individually or collectively, cause the electronic device to acquire a captured image from the camera, identify a total quantity of light in an external environment through the illuminance sensor, recognize objects included in a captured image, determine a quantity of light for each of the recognized objects based on the total quantity of light in the captured image and color information of the captured image acquired through the camera, recognize a target object corresponding to a user gaze direction among objects included in the acquired captured image, output, through the transparent member and the display, a first AR service image that includes at least one virtual object of which at and display, through the display, a second AR service image having a reduced transmittance in at least a partial area of a corresponding transparent member corresponding to a first object at locations of both eyes of the user, when the first object is recognized as being in a glare state, exceeding a reference value, is present among objects located at a preset distance from the target object and/or the virtual object by comparing the quantity of light of the target object, the virtual object, and the objects recognized in the image.

In accordance with another aspect of the disclosure, a method of preventing, by an electronic device, glare for each object of an AR service image is provided. The method includes acquiring a captured image from a camera, identifying a total quantity of light in an external environment through an illuminance sensor, recognizing objects included in the captured image, determining a quantity of light for each recognized object based on the total quantity of light in the captured image and color information of the captured image acquired through the camera, recognizing a target object corresponding to the user gaze direction among objects included in the captured image, outputting, through a transparent member and a display, a first AR service image that includes at least one virtual object of which at least a portion overlaps the captured image in association with the recognized target object, displaying a second AR service image having a reduced transmittance in at least a partial area of a corresponding transparent member when viewing the first object at locations of both eyes of the user, when the first object recognized as being in a glare state, exceeding a reference value, is present among objects located at a preset distance from the target object and/or the virtual object by comparing the quantity of light of the target object, the virtual object, and the objects recognized in the image.

In accordance with another aspect of the disclosure, one or more non-transitory computer-readable storing one or more computer programs including computer-executable instructions that, when executed by one or more processors of an electronic device individually or collectively, cause the electronic device to perform operations is provided. The operations include acquiring a captured image from a camera in correspondence to a field of view of the electronic device, identifying a total quantity of light in an external environment through an illuminance sensor, recognizing objects included in the captured image, determining a quantity of light for each recognized object based on the total quantity of light in the captured image and color information of the captured image acquired through the camera, recognizing a target object corresponding to a user gaze direction among objects included in the captured image, outputting, through a transparent member and a display, a first AR service image that includes at least one virtual object of which at least a portion overlaps the captured image in association with the recognized target object, and displaying a second AR service image having the reduced transmittance in at least a partial area of a corresponding transparent member when viewing the first object at locations of both eyes of the user, when a first object recognized as being in a glare state, exceeding a reference value, is present among objects located at a preset distance from the target object and/or the virtual object by comparing the quantity of light of the target object, the virtual object, and the objects recognized in the image.

An electronic device and a method according to various embodiments may identify the brightness for each object within an augmented reality (AR) service image and may adjust brightness matching between objects such that a user may not feel glare.

When an object (e.g., light source) with brightness in high-luminance is present around a target object that meets the intent of a user or/and a virtual object related to the target object, an electronic device and a method according to various embodiments may adjust the light transmittance of the object with high-luminance brightness or in an object area that causes discomfort to the user's field of view such that the user does not feel the glare phenomenon, thereby improving the user's visual usability.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a wireless fidelity (Wi-Fi) chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
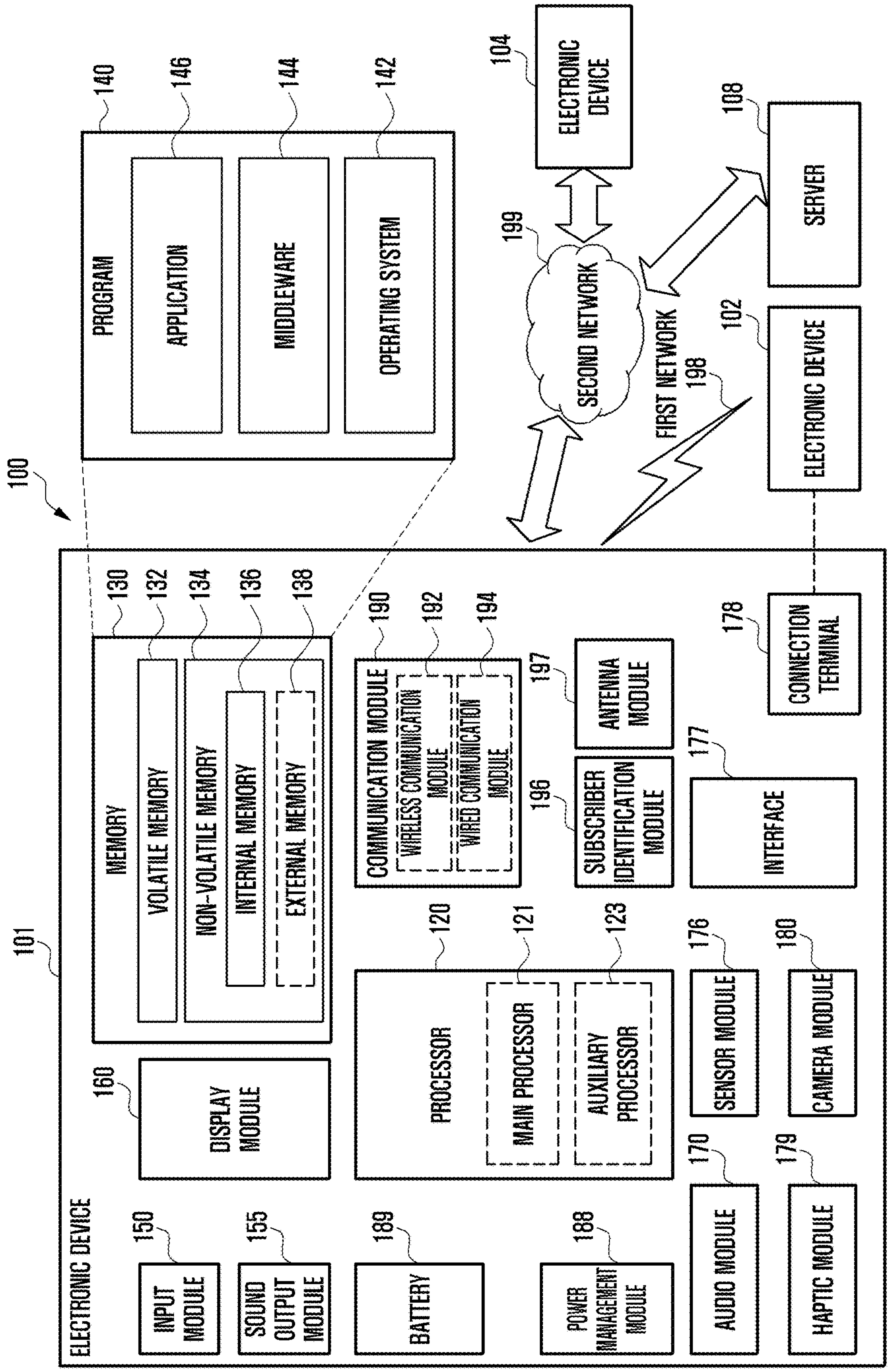
FIG. 1 is a block diagram of an electronic device according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input 1module 150, a sound output 1module 155, a display 1module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the 11connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display 1module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input 1module 150 may include, for example, a microphone, a mouse, a keyboard, a key (e.g., a button), or a digital pen (e.g., a stylus pen).

The sound output module 155 may output sound signals to the outside of the electronic device 101. The sound output 1module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 1module 160 may include, for example, a display, a hologram device, or a projector and control circuitry to control a corresponding one of the display, hologram device, and projector. According to an embodiment, the display 1module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input 1module 150, or output the sound via the sound output 1module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mm Wave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101 according to various embodiments may be one of various types of electronic devices. The electronic devices 101 may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
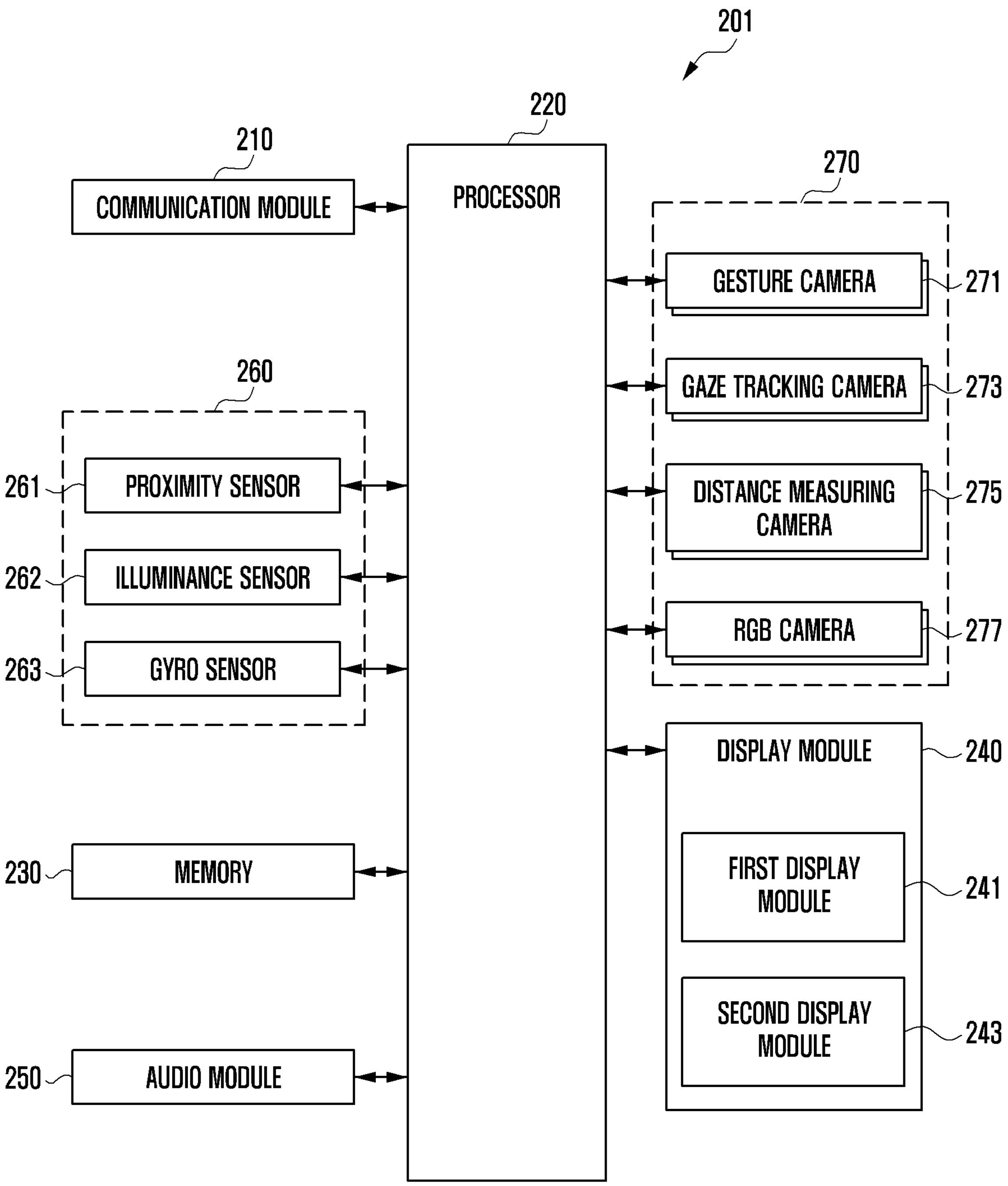
FIG. 2 is a block diagram of an augmented reality (AR) device according to an embodiment of the disclosure.

FIG. 2 is a block diagram of an augmented reality (AR) device according to an embodiment of the disclosure.

Referring to FIG. 2, according to various embodiments, an electronic device (e.g., electronic device 101 of FIG. 1) may be an AR device 201 for supporting an AR service that provides a user with a video related to augmented reality (AR).

According to an embodiment, a display module 240 or a display may display at least one virtual object on at least a portion of a display panel such that a user wearing the electronic device (e.g., AR device) may view the virtual object as being superimposed on a real video (or real image) related to real space acquired through a camera.

According to an embodiment, the AR device 201 may include a communication module 210 (e.g., communication module 190 of FIG. 1), a processor 220 (e.g., processor 120 of FIG. 1), memory 230 (e.g., memory 130 of FIG. 1), the display module 240 (e.g., display module 160 of FIG. 1), an audio module 250 (e.g., audio module 170 of FIG. 1), a sensor module 260 (e.g., sensor module 176 of FIG. 1), and a camera module 270 (e.g., camera module 180 of FIG. 1). Although not illustrated, the AR device 201 may further include a power management module (not shown) and a battery (not shown).

According to an embodiment, the communication module 210 (e.g., wireless communication circuit) may perform communication with the electronic device (e.g., electronic device 101 of FIG. 1) through a wireless communication network (e.g., first network 198 of FIG. 1) (e.g., short-range wireless communication network), or may perform wireless communication with a server device through a long-range wireless network (e.g., second network 199 of FIG. 1). For example, the AR device 201 may perform wireless communication with the electronic device (e.g., electronic device 101 of FIG. 1) and may exchange command and/or data with each other.

According to an embodiment, the communication module 210 may support 5G network after 4G network and next-generation communication technology, for example, new radio (NR) access technology. The NR access technology may support high-speed transmission of high-capacity data (enhanced mobile broadband (eMBB)), minimization of UE power and access of multiple UEs (massive machine type communications (mMTC)), or ultra-reliable and low-latency communications (URLLC). The communication module 210 may support, for example, a high-frequency band (e.g., mm Wave band) to achieve a high data transmission rate. The communication module 210 may support various technologies to secure performance in a high-frequency band, for example, beamforming, massive multiple-input and multiple-output (MIMO), full dimensional (FD) MIMO, an array antenna, analog beam-forming, and a large scale antenna.

According to an embodiment, the display or the display module 240 (hereinafter, referrable to as display) may display at least one virtual object on at least a portion of the display panel such that the user wearing the AR device 201 may view the virtual object as being superimposed on a video related to the real space acquired through the camera module 270.

The camera module 270 may include a gesture camera 271, a gaze tracking camera 273, a distance measuring camera 275, and an RGB camera 277.

According to some embodiments, the display module 240 may include a first display module 241 corresponding to the left eye and/or a second display module 243 corresponding to the right eye between the user's both eyes.

According to an embodiment, the display module 240 may be configured as a transparent or translucent display.

According to an embodiment, the display module 240 may include a lens. The lens may include a lens that includes a transparent waveguide. The lens may transmit light output from the display panel to the user's eye. For example, light emitted from the display panel may pass through the lens and may be transmitted to the user through a waveguide (e.g., waveguide) formed within the lens. The waveguide may include at least one of at least one diffractive element (e.g., diffractive optical element (DOE), holographic optical element (HOE)) and a reflective element (e.g., reflective mirror). The waveguide may guide display light emitted from a light source portion to the user's eye using at least one diffractive element or the reflective element. The user may perceive the real space (or real environment) behind the display by passing through the display module 240.

According to an embodiment, the audio module 250 may convert sound to an electrical signal or, reversely, may convert the electrical signal to sound under control of the processor 220. For example, the audio module 250 may include a speaker and/or a microphone.

According to an embodiment, the sensor module 260 may detect a movement of the AR device 201. The sensor module 260 may detect the physical quantity related to the movement of the AR device 201, for example, speed, acceleration, angular acceleration, or a geographical location of the AR device 201.

According to an embodiment, the sensor module 260 may include various sensors. For example, the sensor module 260 may include a proximity sensor 261, an illuminance sensor 262, and/or a gyro sensor 263, but is not limited thereto. The proximity sensor 261 may detect an object adjacent to the AR device 201. The illuminance sensor 262 may measure a level of brightness around the AR device 201. According to an embodiment, the processor 220 may use the illuminance sensor 262 to identify degree of brightness around the AR device 201 and may change configuration information related to the brightness of the display module 240 based on the degree of brightness. The gyro sensor 263 may detect a state (or posture, direction) and a location of the AR device 201. The gyro sensor 263 may detect the movement of the AR device 201 or the user wearing the AR device 201.

According to an embodiment, the processor 220 may execute a program (e.g., program 140 of FIG. 1) stored in the memory 230 to control at least one other component (e.g., communication module 210, display module 240, audio module 250, sensor module 260, camera module 270) related to functions of the AR device 201 and to perform data processing or operation required for tasks related to an augmented reality service (e.g., AR tasks). For example, the processor 220 may include a computation processing unit.

According to an embodiment, the processor 220 may acquire video information by capturing a video related to the real space corresponding to the field of view of the user wearing the AR device 201 through the camera module 270. The processor 220 may recognize information corresponding to an area determined as the user's field of view (FoV) in the video related to the real space acquired through the camera module 270 of the AR device 201. The processor 220 may generate a virtual object based on video information-based virtual information. The processor 220 may display a virtual object related to the augmented reality service together with the video information through the display module 240.

According to an embodiment, the processor 220 may measure physical quantity related to the movement of the AR device 201 (e.g., geographical location, speed, acceleration, angular speed, and angular acceleration of AR device 201) through the sensor module 260, and may acquire movement information of the AR device 201 using the measured physical quantity or the combination thereof.

According to an embodiment, the processor 220 may analyze movement information and video information of the AR device 201, and may control AR tasks, for example, a head tracking task, a hand tracking task, and an eye tracking task, to be processed.

According to an embodiment, all or a portion of operations executed in the AR device 201 may be executed in at least one external electronic device among electronic devices (e.g., 102, 104, or 108 of FIG. 1). For example, when the AR device 201 needs to perform a function or a service automatically or in response to a request from the user or another device, the AR device 201 may request one or more external electronic devices to perform at least a portion of the function or the service instead of or in addition to executing the function or the service on its own. The one or more external electronic devices that receive the request may execute at least a portion of the requested function or service or an additional function or service related to the request and may transmit results of the execution to the AR device 201. The AR device 201 may provide the results as is or additionally processed as at least a portion of response to the request.

For example, the external electronic device (e.g., 102 of FIG. 1) may render content data executed in an application and then transmit the same to the AR device 201, and the AR device 201 that receives the data may output the content data (e.g., AR service image) to the display module 240. If the AR device 201 detects a user movement through a specific sensor, the processor 220 of the AR device 201 may correct rendering data received from the external electronic device based on movement information and may output the same to the display module 240. Alternatively, the processor 220 of the AR device 201 may transmit the movement information to the external electronic device and may request rendering such that screen data may be updated.

Figure 3:
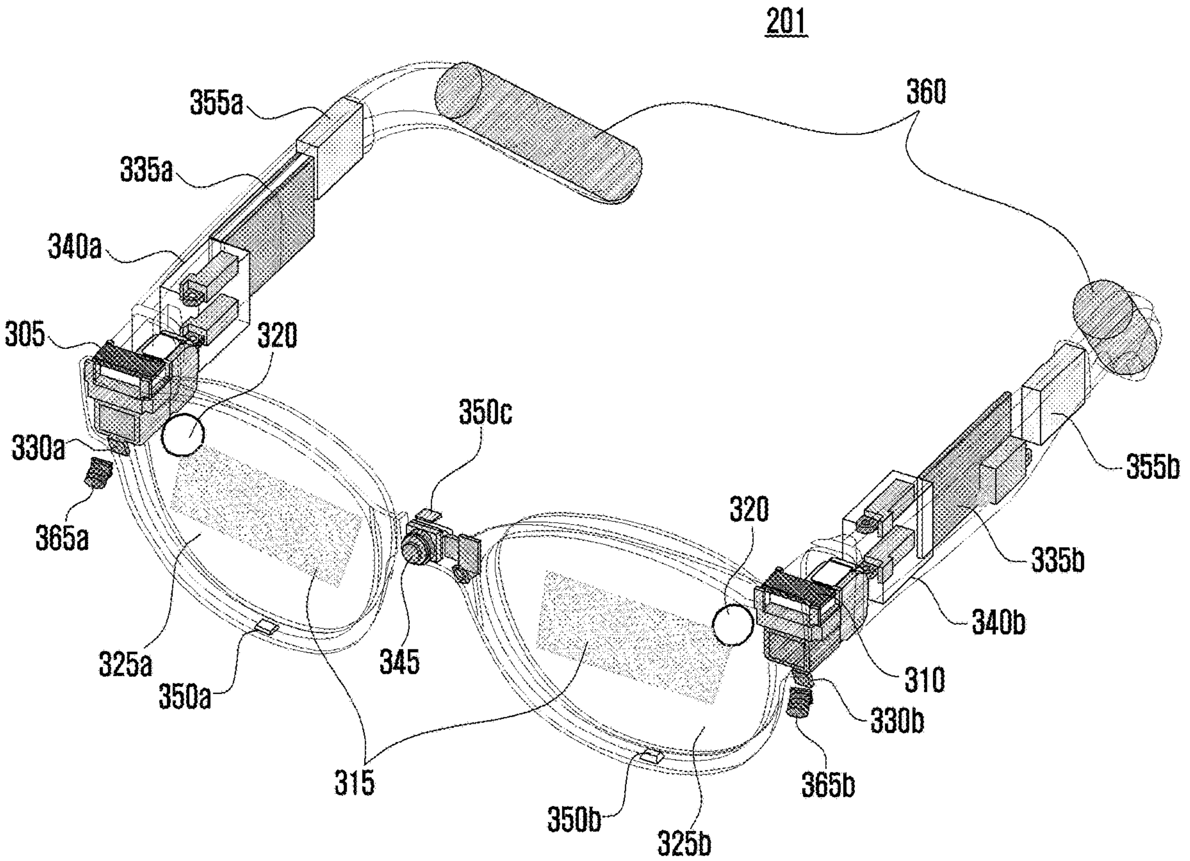
FIG. 3 illustrates an AR device according to an embodiment of the disclosure.

FIG. 3 illustrates an AR device according to an embodiment of the disclosure.

Referring to FIG. 3, the AR device 201 that provides the user with a video related to an augmented reality (AR) service may be configured in a form of at least one of glasses, goggles, a helmet, and a cap, but is not limited thereto.

For example, the AR device 201 may be a head-mounted device (HMD), a head-mounted display (HMD), or AR glasses.

The AR device 201 may provide the augmented reality service that outputs at least one virtual object such that it appears to overlap an area determined to be within the user's field of view (FoV). For example, the area determined to be within the user's field of view is an area that is determined to be perceivable by the user through the AR device 201, and may be an area that includes all or at least a portion of the display of the AR device 201.

The AR device 201 may further include at least a portion of configurations and/or functions of FIGS. 1 and 2, and overlapping configurations may be substantially identical to those of FIG. 1 or 2.

In an embodiment, the AR device 201 may include a first display 305, a second display 310, a screen display unit 315, an input optical member 320, a first transparent member **325*a*, a second transparent member 325*b*, lighting units 330*a* and 330*b*, a first printed circuit board (PCB) 335*a*, a second PCB 335*b*, a first hinge 340*a*, a second hinge 340*b*, a first camera 345 (e.g., camera module 270 of FIG. 2), a plurality of microphones (e.g., first microphone 350*a*, second microphone 350*b*, and third microphone 350*c*), a plurality of speakers (e.g., first speaker 355*a* and second speaker 355*b*) (e.g., audio module 250 of FIG. 2), a battery 360, a second camera 365*a* (e.g., camera module 270 of FIG. 2), and a third camera 365*b* (e.g., camera module 270 of FIG. 2**).

In an embodiment, the display (first display 305 and second display 310) (e.g., display module 160 of FIG. 1, display module 240 of FIG. 2) may include, for example, a liquid crystal display (LCD), a digital mirror device (DMD), a liquid crystal on silicon (LCoS), a light emitting diode (LED) on silicon (LEDoS), an organic light emitting diode (OLED), or a micro light emitting diode (micro LED).

In an embodiment, when the display (first display 305 and second display 310) includes one of a liquid crystal display, a digital mirror display, and a liquid crystal on silicon, the AR device 201 may include a light source that irradiates light to a screen output area of the display (first display 305 and second display 310). In an embodiment, when the display (first display 305 and second display 310) is capable of generating light on its own, for example, when the display includes an organic light emitting diode or a micro LED, the AR device 201 may provide a good quality virtual video to the user even without including a separate light source. In an embodiment, if the display is implemented as the organic light emitting diode or the micro LED, the light source is not required, so the AR device 201 may be made lighter.

The display (first display 305 and second display 310) according to embodiments may be configured with at least one micro light emitting diode (LED). For example, the micro LED may express red (R), green (G), and blue (B) with self-luminescence and, due to its small size (e.g., 100 μm or less), a single chip may implement a single pixel (e.g., one of R, G, and B). Therefore, when the display (first display 305 and second display 310) is configured with the micro LED, high resolution may be provided without a backlight unit (BLU).

Without being limited thereto, a single pixel may include R, G, and B, and a single chip may be implemented with a plurality of pixels including R, G, and B.

In an embodiment, the display (first display 305 and second display 310) may include a display area configured with pixels to display a virtual video and light-receiving pixels (e.g., photo sensor pixels) provided between pixels to receive light reflected from the eye, to convert the light to electrical energy, and to output the same.

In an embodiment, the AR device 201 (e.g., processor 220 of FIG. 2) may detect the user's gaze direction (e.g., pupil movement) through the light-receiving pixels. For example, the AR device 201 may detect and track a gaze direction for the user's left eye and a gaze direction for the user's right eye through one or more light-receiving pixels that constitute the first display 305 and one or more light-receiving pixels that constitute the second display 310. The AR device 201 may determine a location of the center of the virtual video based on the gaze directions of the user's right eye and left eye (e.g., directions in which pupils of user's right eye and left eye are gazing) that are detected through the one or more light-receiving pixels.

In an embodiment, light emitted from the display (e.g., first display 305 and second display 310) may pass through a lens (not shown) and a waveguide, and may reach the screen display unit 315 formed on the first transparent member 325*a* to face the user's right eye and the screen display unit 315 formed on the second transparent member 325*b* provided to face the user's left eye. For example, light emitted from the display (e.g., first display 305 and second display 310) may pass through the waveguide and may be reflected from a grating area formed in the input optical member 320 and the screen display unit 315 to be transmitted to the user's eyes. The first transparent member 325*a* and/or the second transparent member 325*b* may be formed of a glass plate, a plastic plate, or polymer, and may be transparently or translucently manufactured.

In an embodiment, the lens (not shown) may be provided on the front surface of the display (e.g., first display 305 and second display 310). The lens (not shown) may include a concave lens and/or a convex lens. The lens may function to adjust the focus such that a screen (e.g., AR service video) output to the display (first display 305 and second display 310) may be visible to the user's eye. For example, light emitted from the display panel may pass through the lens and may be transmitted to the user through the waveguide (e.g., waveguide) formed within the lens. The lens may be configured using a Fresnel lens, a pancake lens, or a multichannel lens.

In an embodiment, the screen display unit 315 or the transparent member (or window member) (e.g., first transparent member 325*a*, second transparent member 325*b*) may include a lens including a waveguide and a reflective lens.

In an embodiment, the waveguide may be manufactured using glass, plastic, or polymer, and may include a nano pattern formed on one surface of the interior or the exterior, for example, the grating structure in a polygonal or curved shape. According to an embodiment, light incident at one end of the waveguide may be propagated inside the display waveguide due to the nano pattern and may be provided to the user. In an embodiment, the waveguide configured as a free-form prism may provide the incident light to the user through the reflective mirror. The waveguide may include at least one of at least one diffractive element (e.g., diffractive optical element (DOE) and holographic optical element (HOE)) and the reflective element (e.g., reflective mirror). In an embodiment, using at least one diffractive element or the reflective element included in the waveguide, the waveguide may guide light emitted from the display 305, 310 to the user's eye.

According to various embodiments, the diffractive element may include the input optical member 320/output optical member (not shown). For example, the input optical member 320 may represent an input grating area, and the output optical member (not shown) may represent an output grating area. The input grating area may serve as an input end that diffracts (or reflects) light output from the light source unit (e.g., micro LED) to transmit the light to the transparent member (e.g., first transparent member 325*a*, second transparent member 325*b*) of the screen display unit 315. The output grating area may serve as an exit that diffracts (or reflects) light transmitted to the transparent member (e.g., first transparent member 325*a*, second transparent member 325*b*) of the waveguide toward the user's eye.

According to various embodiments, the reflective element may include a total internal reflection optical element or a total internal reflection waveguide for total internal reflection (TIR). For example, the total internal reflection refers to one method of guiding light and may represent generating an angle of incidence such that light (e.g., virtual video) incident through the input grating area is reflected substantially 100% from one surface (e.g., specific surface) of the waveguide, and allowing the light to be transmitted substantially 100% to the output grating area.

In an embodiment, an optical path of the light emitted from the display (e.g., first display 305 and second display 310) may be guided to the waveguide through the input optical member 320. Light that moves inside the waveguide may be guided toward the user's eye through the output optical member. The screen display unit 315 may be determined based on light emitted toward the eye.

According to an embodiment, the screen display unit 315 or the transparent member (or window member) (e.g., first transparent member 325*a*, second transparent member 325*b*) may further include a transmittance adjustment member (not shown). The transmittance adjustment member may serve to adjust the light transmittance in response to a supply voltage or a supply current for light that is transmitted to the first transparent member 325*a* and the second transparent member 325*b*. The transmittance adjustment member may be coupled to the front surface or the rear surface of the lens, or may be coupled to the front surface of an optical system of the display. The transmittance adjustment member may adjust the light transmittance to be close to approximately 100% to 0% depending on the voltage (or current) being supplied.

For example, the processor 220 may identify a location of both eyes and the left eye of the user wearing the AR device 201, and, when the user views a specific object in an AR environment, may calculate binocular disparity (difference between right eye and left eye) and may determine a masking area for adjusting the light transmittance. The masking area may include a first masking area corresponding to the eye (e.g., right eye) that views through the first display 305 and a second masking area corresponding to the eye (e.g., left eye) that views through the second display 310. The processor 220 may adjust (e.g., increase or decrease) the light transmittance by controlling the voltage (or current) supplied to the masking area corresponding to both eyes through the transmittance adjustment member.

In an embodiment, the first camera 345 may be referred to as high resolution (HR) or photo video (PV), and may include a high-resolution camera. The first camera 345 may include a color camera equipped with functions for acquiring a high-quality video, such as an auto focus (AF) function and an optical image stabilizer (OIS). Without being limited thereto, the first camera 345 may include a global shutter (GS) camera or a rolling shutter (RS) camera.

In an embodiment, the second camera 365*a* and the third camera 365*b* may include a camera used for 3 degrees of freedom (3DoF), 6DoF of head tracking, hand detection and tracking, and gesture and/or space recognition. For example, the second camera 365*a* and the third camera 365*b* may include a global shutter (GS) camera to detect a movement of head and hand and to track the movement.

In an embodiment, at least one sensor (e.g., gyro sensor, acceleration sensor, geomagnetic sensor, and/or gesture sensor), the second camera 365*a*, and the third camera 365*b* may perform at least one of head tracking for 6DoF, movement detection and prediction (pose estimation & prediction), gesture and/or simultaneous localization and mapping (SLAM) function through space recognition and depth capturing.

In an embodiment, the second camera 365*a* and the third camera 365*b* may be used by being classified into a camera for head tracking and a camera for hand tracking.

In an embodiment, the lighting units 330*a* and 330*b* may have different usage depending on attachment locations. For example, the lighting units 330*a* and 330*b* may be attached together with the second camera 365*a* and the third camera 365*b* mounted around hinges (e.g., first hinge 340*a*, second hinge 340*b*) each that connects a frame and a template or around a bridge that connects the frames. In the case of shooting with the GS camera, the lighting unit 330*a*, 330*b* may be used as a method for supplementing ambient brightness. For example, when it is not easy to detect a subject desired to shoot due to a dark environment or mixing of a plurality of light sources and reflected light, the lighting unit 330*a*, 330*b* may be used.

In an embodiment, components (e.g., processor 220 and memory 230 of FIG. 2) that constitute the AR device 201 may be positioned on a PCB (e.g., first PCB 335*a*, second PCB 335*b*). The PCB may transmit electrical signals to the components that constitute the AR device 201.

In an embodiment, the plurality of microphones (e.g., first microphone 350*a*, second microphone 350*b*, and third microphone 350*c*) may process external sound signals to electrical voice data. The processed voice data may be utilized in various ways depending on a function being performed (or application being executed) on the AR device 201.

In an embodiment, the plurality of speakers (e.g., first speaker 355*a* and second speaker 355*b*) may output audio data stored from the communication module (e.g., communication module 210 of FIG. 2) or stored in the memory (e.g., memory 230 FIG. 2).

In an embodiment, at least one battery 360 may be include and may supply power to components that constitute the AR device 201.

According to an embodiment, the AR device 201 may include a frame (not shown), a transparent member (e.g., transparent member of FIG. 3) configured to be supported by the frame, a display configured to output visual information through the transparent member, a camera provided to the frame to capture the front of the frame, an illuminance sensor configured to detect the total quantity of light in a captured image that enters the camera, and a processor operatively connected to each of the components, and memory.

An electronic device (e.g., augmented reality (AR) device) (e.g., electronic device 101 of FIG. 1, AR device 201 of FIGS. 2 and 3) according to an embodiment may further include a frame, and the electronic device 101, 201 may include a transparent member (e.g., first transparent member 325*a* and/or second transparent member 325*b*) configured to be supported by the frame. The electronic device 101, 201 may include a display module (e.g., display module 160 of FIG. 1, display module 240 of FIG. 2, first display 305 and second display 310 of FIG. 3) configured to output visual information to the transparent member. The electronic device 101, 201 may include a camera (e.g., camera module 180 of FIG. 1, camera module 270 of FIG. 2) provided to the frame to capture the front of the frame. The electronic device 101, 201 may include an illuminance sensor (e.g., illuminance sensor 262 of FIG. 2). The electronic device 101, 201 may include memory (e.g., memory 130 of FIG. 1, memory 230 of FIG. 2). The electronic device 101, 201 may include a processor (e.g., processor 120 of FIG. 1, processor 220 of FIG. 2) operatively connected to the display module, the camera, and the illuminance sensor. The memory 230 may include an instruction configured to, when executed, cause the processor 220 to acquire an image (or captured image) from the camera in correspondence to a field of view of the user wearing the electronic device 101, 201. The memory 230 may include an instruction configured to cause the processor 220 to identify the total quantity of light in an external environment through the illuminance sensor. The memory 230 may include an instruction configured to cause the processor 220 to recognize objects included in a captured image acquired through the camera. The memory 230 may include an instruction configured to cause the processor 220 to determine the quantity of light for each recognized object based on the total quantity of light in the captured image and color information of the captured image acquired through the camera. The memory 230 may include an instruction configured to cause the processor 220 to recognize a target object corresponding to the user intent among objects included in the acquired captured image. The memory 230 may include an instruction configured to cause the processor 220 to provide the user with a first AR service image that includes at least one virtual object of which at least a portion overlaps the captured image in association with the recognized target object, through the transparent member and the display. The memory 230 may include an instruction configured to cause the processor 220 to compare the quantity of light of the target object, the virtual object, and objects recognized in the captured image and to determine whether a first object recognized as being in a glare state, exceeding a reference value, is present among objects located at a preset distance from the target object and/or the virtual object. The memory 230 may include an instruction configured to cause the processor 220 to display, through the display, a second AR service image having the reduced transmittance in at least a partial area of a corresponding transparent member when viewing the first object at locations of both eyes of the user through the transparent member and the display, based on the presence of the first object.

According to an embodiment, the memory 230 may further include an instruction configured to cause the processor 220 to perform an image segmentation and to recognize objects included in the captured image.

According to an embodiment, the color information may include an RGB value of an image sensor corresponding to locations of objects recognized within the captured image.

According to an embodiment, the memory 230 may further include instructions configured to cause the processor 220 to, when the first object is located within a preset distance from the target object or located within a preset distance from the virtual object, decrease the transmittance in at least a partial area of a corresponding transparent member when viewing the first object, to, when the first object is the target object, increase the brightness of the virtual object, or to when it is not possible to increase the brightness of the virtual object, decrease the transmittance in at least a partial area of the corresponding transparent member when viewing the first object.

According to an embodiment, the memory 230 may further include an instruction configured to cause the processor 220 to recognize an object at which the user gazes for a specific period of time as a target object, through gaze tracking according to a gaze direction of the user wearing the AR device.

According to an embodiment, the memory 230 may further include an instruction configured to cause the processor 220 to track a hand of the user and a hand movement through the camera and when the user performs a motion of selecting a specific object within a first AR service image through the hand movement, recognize the selected specific object as the target object.

According to an embodiment, the memory 230 may further include an instruction configured to cause the processor 220 to acquire object recognition information or object classification information as a result of performing the image segmentation and to generate a virtual object based on the object recognition information.

According to an embodiment, the virtual object is generated based on auxiliary user experience (UX) information that describes or guides the target object.

According to an embodiment, the memory 230 may further include an instruction configured to cause the processor 220 to measure a glare index for each object recognized within the captured image using technology for measuring a glare index for an object included in the image and to determine whether the first object is present based on the glare index.

According to an embodiment, in the electronic device 101, 201, at least a portion of the transparent member or the display module may include a transmittance adjustment member, and the memory 230 may further include instructions configured to cause the processor 220 to, when a first object that exceeds a reference value is located around the target object or/and the virtual object, identify locations of both eyes of the user wearing the electronic device, calculate binocular disparity and determine a corresponding first masking area when the user views the first object with the right eye and a corresponding second masking area when the user views the same with the left eye within the transmittance adjustment member, and decrease the light transmittance by controlling a voltage or a current being supplied to the first masking area and the second masking area within the transmittance adjustment member.

Figure 4:
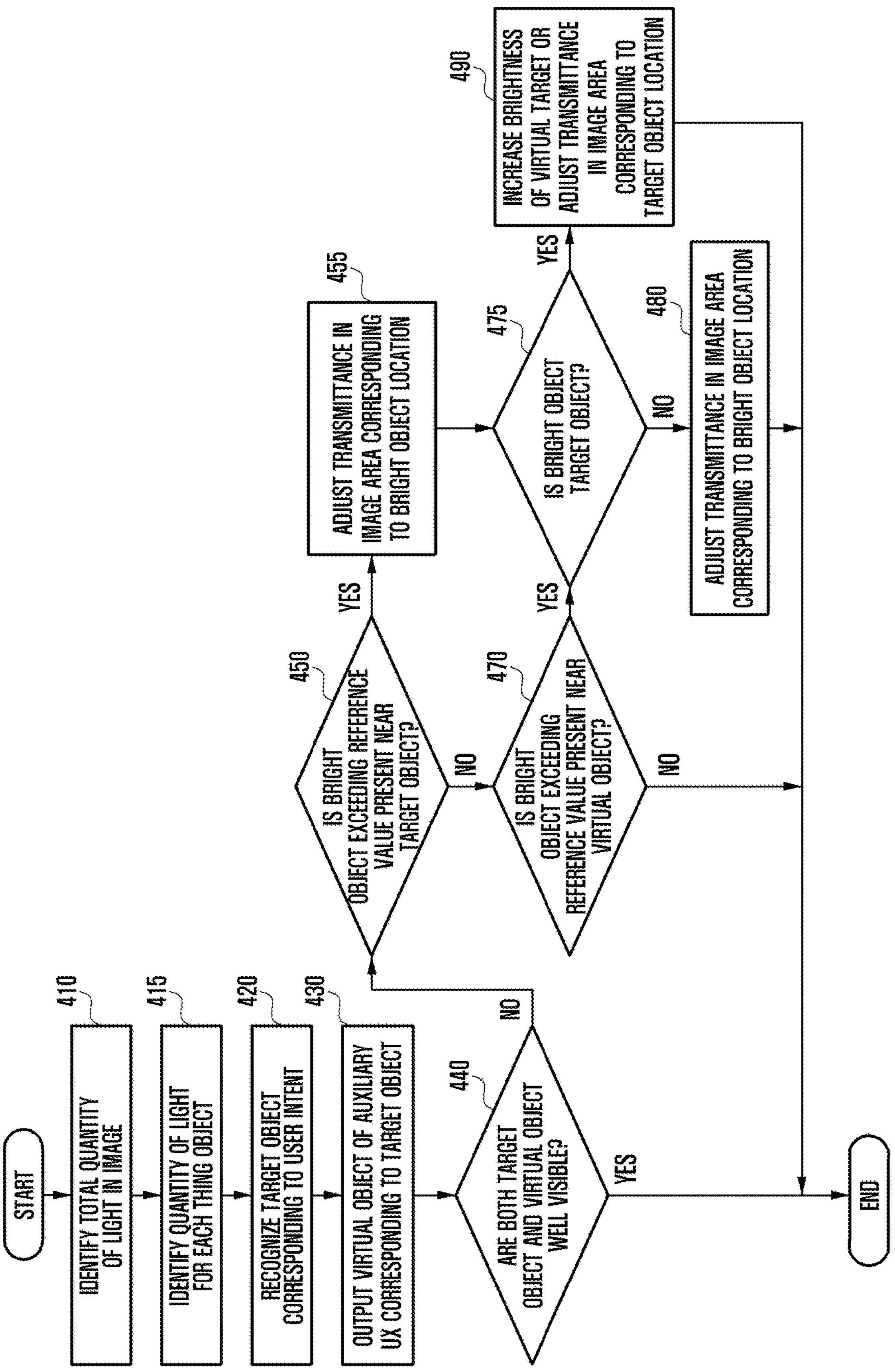
FIG. 4 is a flowchart illustrating a method of preventing, by an AR device, glare for each object in an AR service image according to an embodiment of the disclosure.

FIG. 4 is a flowchart illustrating a method of preventing, by an AR device, glare for each object in an AR service image according to an embodiment of the disclosure.

Figure 5A:
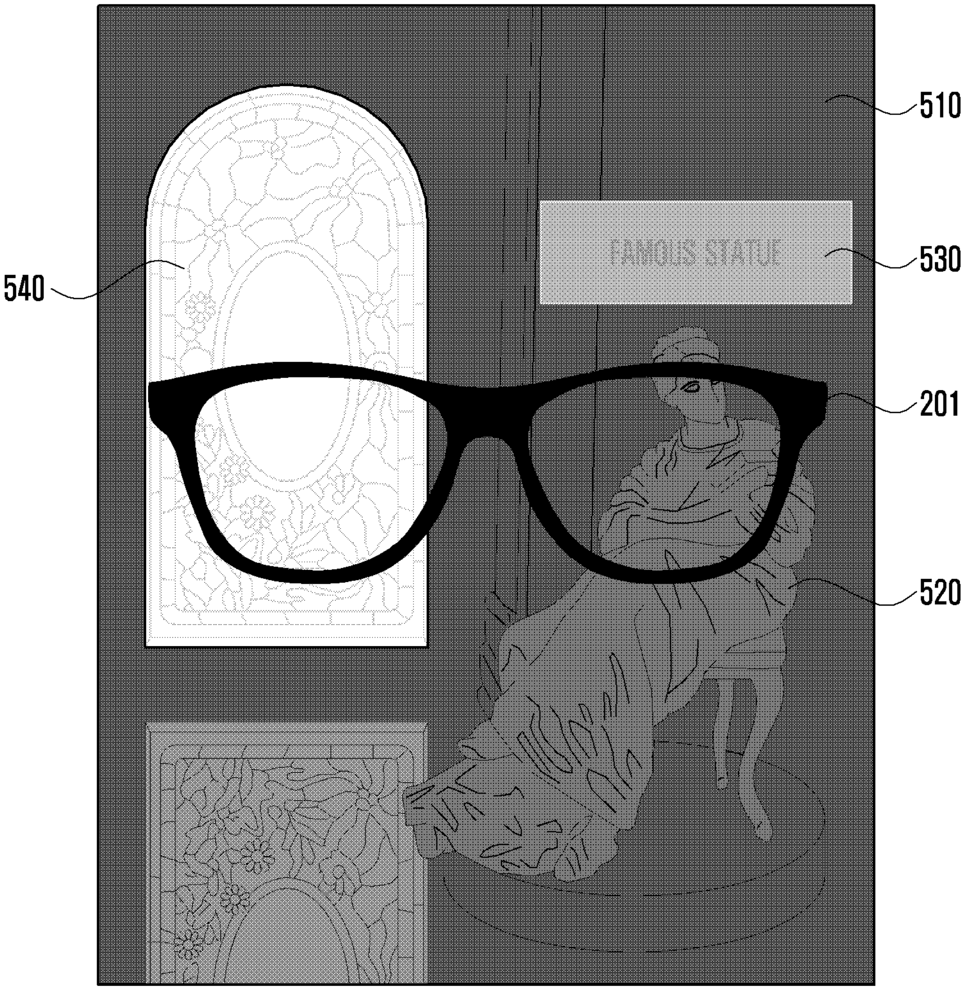
FIG. 5A illustrates an example screen of an AR service image according to an embodiment of the disclosure.

FIG. 5A illustrates an example screen of an AR service image according to an embodiment of the disclosure.

Figure 5B:
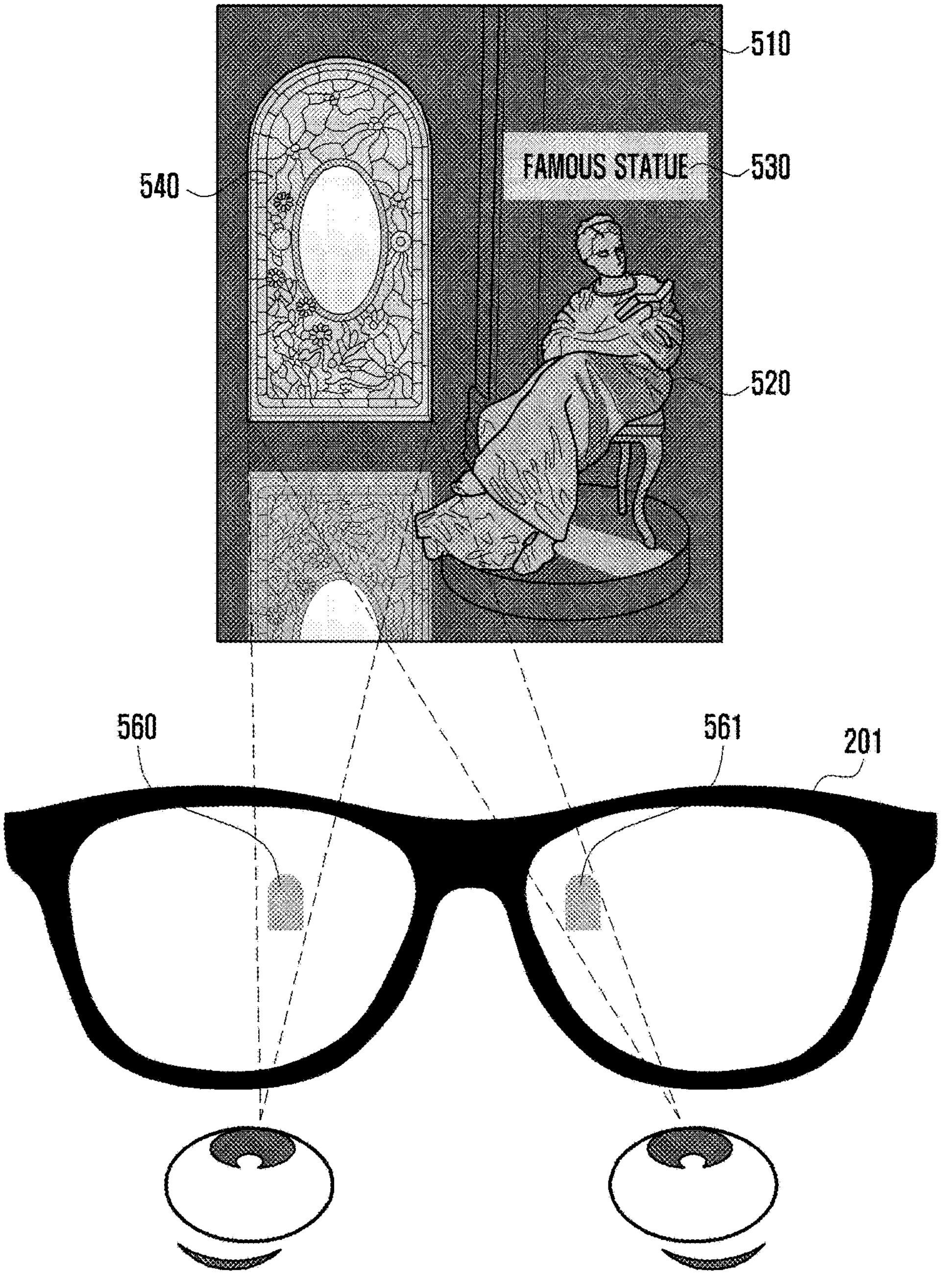
FIG. 5B illustrates an example screen of an AR service image after the light transmittance is adjusted on an AR service image screen of FIG. 5A according to an embodiment of the disclosure.

FIG. 5B illustrates an example screen of an AR service image after the light transmittance is adjusted on an AR service image screen of FIG. 5A according to an embodiment of the disclosure.

In the following embodiments, each of operations may be sequentially performed, but not necessarily performed in a sequential manner. For example, the order of each of the operations may be changed and at least two operations may be performed in parallel.

Referring to FIG. 4, in operation 410, a processor (e.g., processor 120 of FIG. 1, processor 220 of FIG. 2) of the AR device 201 may identify the total quantity of light in an external environment through a camera or an image sensor (e.g., camera module 180 of FIG. 1, camera module 270 of FIG. 2) using an illuminance sensor (e.g., illuminance sensor 262 of FIG. 2).

For example, the illuminance sensor 262 may measure ambient illuminance or ambient light quantity and may transmit a light quantity measurement signal (e.g., illuminance sensor value) to the processor 220. The processor 220 may identify the total quantity of light that enters the camera or the image sensor (e.g., camera module 270 of FIG. 2) based on the light quantity measurement signal transmitted from the illuminance sensor 262. The quantity of light may be measured in units of lux or photo (ph) by the illuminance sensor 262, but is not limited thereto.

In operation 415, the processor 220 may determine (or acquire, identify) the quantity of light for each object included in an image (or captured image) captured through the camera (e.g., camera module 270 of FIG. 2) based on the total quantity of light of the image and color information of the image (or captured image) acquired through the camera.

According to an embodiment, the processor 220 may receive an image (e.g., single input image, camera image, captured image) captured through the camera or the image sensor, may perform an image segmentation (e.g., object segmentation) based on the captured image, and may recognize objects within the captured image.

The image segmentation may represent dividing an image into image areas for each attribute or dividing the image into a plurality of point areas. Alternatively, the image segmentation may include dividing objects of the image (or single input image, captured image) into area units (or pixel units) using an artificial neural network and assigning attribute values, and recognizing and identifying the objects. The artificial neural network may be used alone, or a plurality of artificial neural networks may be used each to perform a segmentation and results thereof may be combined.

According to an embodiment, the processor 220 may identify the quantity of light for each object included in the image based on the total quantity of light of the image by cutting out a recognized object area (or point areas) within the image and by measuring the quantity of light for the cut-out image (e.g., object area image).

According to an embodiment, the processor 220 may determine the quantity of light for each object based on color information (e.g., RGB value) measured for each recognized object within the image. Here, the processor 220 may measure a light quantity level of an object by synthesizing an illuminance value measured through the illuminance sensor 262 and color information measured through the camera. For example, when an illuminance value acquired by measuring the total quantity of light in the image is approximately 100 and color information of the object measured through the camera is 255 and when the illuminance value is approximately 200 and the color information of the object measured through the camera is 255, a brightness level of the object may vary.

The AR device 201 according to an embodiment may more sensitively measure the quantity of light of objects in the image by synthesizing the total quantity of light measured through the illuminance sensor 262 and color information of the object measured through the camera and by estimating a brightness level of a thing.

According to some embodiments, the AR device 201 may support a function of measuring the quantity of light for each object area or point area recognized within the image and adjusting the exposure only for a specific portion within the image based on the measured quantity of light. The AR device 201 may determine a camera exposure level for each specific area of the image (e.g., area in which object is present) and may measure the quantity of light for each object.

In operation 420, the processor 220 may recognize a target object (e.g., first object) corresponding to (or matching) the intent of the user wearing the AR device 201 among objects included in the output image acquired through the display.

According to an embodiment, the processor 220 may display an AR service image or a real image (e.g., first AR service image) through the display (e.g., display module 160 of FIG. 1, display module 240 of FIG. 2) based on detection of the AR device 201 being worn on a part of the user's body. For example, the display is implemented as an optical see-through (OST) or video see-through (VST) type, and may support a function of at least partially displaying AR information such that it appears as if the AR information (e.g., virtual object) is added to the real image acquired through the camera.

For example, the processor 220 may recognize, as a target object, an object at which the user gazes for a specific period of time through gaze tracking according to a gaze direction of the user wearing the AR device 201 (e.g., directions in which pupils of user's right eye and left eye are gazing).

As another example, the processor 220 may track a hand of the user and a hand movement through the camera of the AR device 201 and, when the user performs a motion of selecting a specific object within the AR service image, may recognize the selected specific object as the target object.

In operation 430, the processor 220 may output a virtual object of auxiliary user experience (UX) corresponding to the recognized target object by superimposing the same on the real image.

According to an embodiment, the processor 220 may distinguish objects included in a camera image through an image segmentation and may recognize an object as a specific thing. For example, the image segmentation may output object recognition information from the image. A form of input data (or learning data) of the image segmentation may be an image, and output data (or labeling data) may be object recognition information (or object classification information).

According to an embodiment, the processor 220 may generate a virtual object based on virtual object information related to object recognition information and may render and output the virtual object to overlap a real image near (or around) a target object or within a preset distance from the target object. For example, when the target object is a specific statue, the virtual object may be auxiliary user experience (UX) information that guides detailed information of the specific statue, but it is only an example and is not limited thereto. The virtual object may include information associated with the target object. The preset distance may be at least partially overlapped with the target object and may be a minimum separation distance set during AR rendering.

In operation 450, the processor 220 may determine whether a bright object (e.g., object estimated to be high-luminance light source, glare state object, first object) exceeding a reference value is present around the target object. For example, the brightness of the target object or/and virtual object may be determined as the reference value, but is not limited thereto.

According to some embodiments, as in operation 440, the processor 220 may further include an operation of determining whether both the target object and the virtual object are well visible or whether an object recognition rate is greater than or equal to a set reference (e.g., object is in state in which it is possible to distinguish which object the object is). When both the target object and the virtual object are well visible or whether the object recognition rate is greater than or equal to the reference, the processor 220 may terminate the process of FIG. 4. When both the target object and the virtual object are not well visible or when the object recognition rate is less than the reference, the processor 220 may proceed to operation 450. According to an embodiment, the processor 220 may compare the quantity of light of objects recognized within the image and the brightness of the rendered virtual object and may identify whether visibility is high for each object.

According to an embodiment, the processor 220 may identify brightness matching between objects by comparing the brightness for each object and may determine whether a bright object is present near the target object or/and the virtual object within the user's field of view or within a preset distance from the target object.

According to an embodiment, the processor 220 may measure a unified glare index (e.g., unified glare rating (UGR) value) for each object within the image by applying technology for measuring a glare index for object (e.g., lighting) and may estimate the brightness (or brightness value).

According to an embodiment, the processor 220 may estimate the brightness (or brightness value) for each object recognized within the image based on technology for determining a camera exposure level. An AR service environment has the feature of being exposed to the entire light environment through the AR device (e.g., AR glasses), and the sensory glare phenomenon may occur in which due to a too bright specific object, a target object or a virtual object corresponding to the user intent is not visible. The sensory glare phenomenon may refer to the phenomenon in which, when a high-luminance light source (e.g., sunlight) is present around a visual thing to be seen, light entering the eye is scattered within the eyeball and acts as a light curtain in front of the retina above a certain latitude and consequently, the thing is not recognized.

For example, as shown in <501> of FIG. 5A, the AR device 201 may output, through a display, a first AR service image 510 that includes a virtual object 530 of auxiliary UX corresponding to a target object 520 based on recognition of the target object 520 corresponding to the intent of a user. The user (or wearer) of the AR device 201 may have difficulty in recognizing the virtual object 530 as well as the target object 520 due to the glare phenomenon by a bright object 540 within the user's field of view.

In a situation in which the target object 520 corresponding to the intent of the user is recognized and the virtual object 530 corresponding to the target object 520 is output, the AR device 201 may compare brightness matching between objects recognized within the user's field of view and may recognize that the bright object (e.g., object estimated as high luminance light source, glare state object, first object) 540 exceeding a reference value is present near the target object 520 or within a preset distance from the target object 520.

In operation 455, when the bright object exceeding the reference value is present near the target object, the processor 220 may adjust (e.g., decrease brightness) the light transmittance in an image area corresponding to a bright object location for brightness matching between surrounding objects.

According to an embodiment, the display or the transparent member of the AR device 201 may further include a transmittance adjustment member configured to be capable of changing the light transmittance.

The transmittance adjustment member may adjust the light transmittance in response to a supply voltage or a supply current for light being transmitted. The transmittance adjustment member may be coupled to the front surface or the rear surface of a lens or may be coupled to the front surface of an optical system of the display. The transmittance adjustment member may adjust the light transmittance to be close to approximately 100% to 0% depending on the voltage (or current) being supplied.

According to an embodiment, the processor 220 may determine masking areas of both eyes corresponding to a location of the bright object within an image output through the display based on locations of both eyes of the user wearing the AR device 201, and may adjust (e.g., decrease brightness) the light transmittance in masking areas of both eyes through the transmittance adjustment member.

For example, as shown in <502> of FIG. 5B, the AR device 201 may provide the user with a second AR service image of which light transmittance is adjusted at the bright object location. The processor 220 of the AR device 201 may identify locations of both eyes of the user wearing the AR device 201, may calculate binocular disparity (difference between right eye and left eye), and may determine a masking area when viewing the bright object 540. Since locations of images formed when viewing the bright object 540 at locations of both eyes of the user differ, the processor 220 may determine a location of a first masking area 560 corresponding to the eye that views through a first display and a location of a second masking area 561 corresponding to the eye that views through a second display, and may decrease the light transmittance by controlling a voltage (or current) supplied to the first masking area 560 and the second masking area 561.

When the user substantially views the bright object 540 through the display of the AR device 201, the user may perceive the brightness of the bright object 540 of which light transmittance is adjusted through the first masking area 560 and the second masking area 561. That is, in the user's field of view, the bright object 540 is not perceived as having the brightness exceeding the reference value and the bright object 540 is viewed with a lower brightness value compared to <501>. Therefore, when viewing with eyes of the user, the glare phenomenon disappears, which makes it possible to provide the effect of more clearly recognizing the target object 520 and/or the virtual object 530.

In operation 470, when the bright object exceeding the reference value is present near the target object, the processor 220 may determine whether the bright object (e.g., first object) exceeding the reference value is present near the virtual object.

When the bright object exceeding the reference value is not present even near the virtual object, the processor 220 may terminate the process of FIG. 4.

In operation 475, when the bright object exceeding the reference value is present near the virtual object, the processor 220 may identify whether the bright object is the target object. In operation 480, when the bright object exceeding the reference value near the virtual object is not the target object, the processor 220 may adjust the transmittance in an image area corresponding to the bright object location.

According to an embodiment, the processor 220 may adjust (e.g., decrease) the light transmittance in the image area corresponding to the bright object location for brightness matching between objects.

In operation 490, when the bright object exceeding the reference value near the virtual object is the target object, the processor 220 may increase the brightness of the virtual object. Alternatively, when the processor 220 may not increase the brightness of the virtual object, the processor 220 may adjust the transmittance in an image area corresponding to a target object location.

According to an embodiment, when a user gaze direction identifies a target object as a bright object compared to surrounding objects, the processor 220 may determine a masking area corresponding to a location of a virtual object based on locations of both eyes of the user, and may control the virtual object to be viewed by increasing the light transmittance in the masking area, or may increase the brightness of the virtual object by adjusting a brightness value of rendered virtual object data. Alternatively, when the processor 220 may not adjust the brightness of the virtual object, the processor 220 may adjust (e.g., decrease) the transmittance in an image area corresponding to a target object location.

Figure 6:
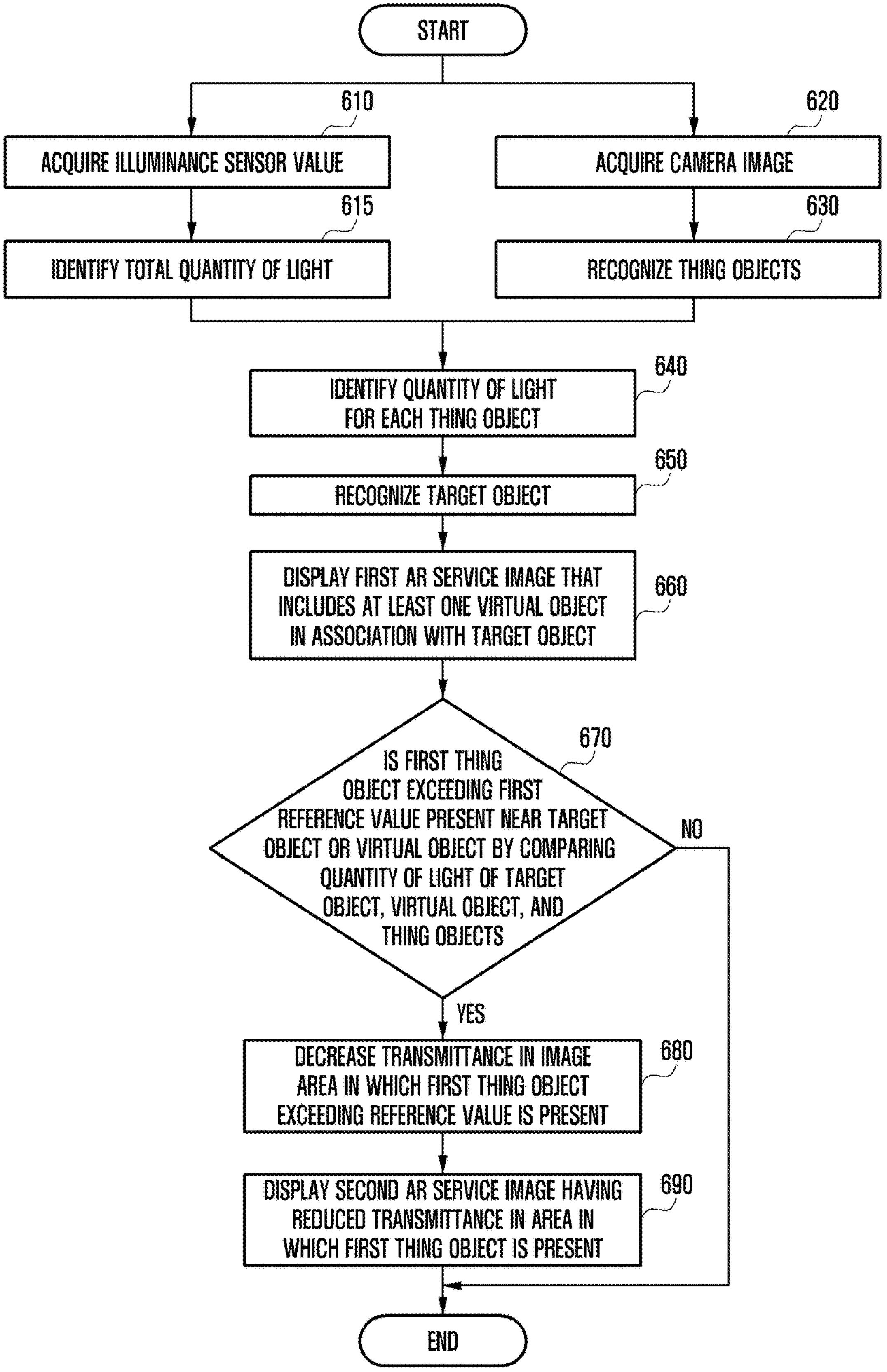
FIG. 6 is a flowchart illustrating a method of preventing, by an AR device, glare for each object in an AR service image according to an embodiment of the disclosure.

FIG. 6 is a flowchart illustrating a method of preventing, by an AR device, glare for each object in an AR service image according to an embodiment of the disclosure.

In the following embodiment, each of operations may be sequentially performed, but not necessarily performed in a sequential manner. For example, the order of each of the operations may be changed and at least two operations may be performed in parallel.

In operation 610, a processor (e.g., processor 120 of FIG. 1, processor 220 of FIG. 2) of the AR device 201 may acquire an illuminance sensor value from an illuminance sensor. For example, the illuminance sensor 262 may measure ambient illuminance or ambient light quantity, and may transmit a light quantity measurement signal (e.g., illuminance sensor value) to the processor 220.

In operation 615, the processor 220 may identify the total quantity of light in an external environment through a camera or an image sensor (e.g., camera module 270 of FIG. 2) based on the light quantity measurement signal transmitted from the illuminance sensor 262.

In operation 630, the processor 220 may recognize objects within a camera image (e.g., single input image) captured through the camera or the image sensor in operation 620.

For example, the processor 220 may perform an image segmentation (e.g., object segmentation) and may recognize objects within the camera image. The processor 220 may distinguish objects included in the camera image through the image segmentation and may recognize that an object is a specific thing as a result of object recognition. For example, the image segmentation may output object recognition information from the image. A form of input data (or learning data) of the image segmentation may be an image, and output data (or labeling data) may be object recognition information (or object classification information).

In operation 640, the processor 220 may determine the quantity of light for each recognized object based on the total quantity of light of the image and color information of the image acquired through the camera.

According to an embodiment, the processor 220 may determine the quantity of light for each object included in the image based on the total quantity of light of the image by cutting out a recognized object area (or point areas) within the image and by measuring the quantity of light for the cut-out image (e.g., object area image).

According to an embodiment, the processor 220 may identify the quantity of light for each object based on color information (e.g., RGB value) measured for each recognized object in the image. Here, the processor 220 may measure a light quantity level of an object by synthesizing an illuminance value measured through the illuminance sensor 262 and color information measured through the camera. For example, when an illuminance value acquired by measuring the total quantity of light in the image is approximately 100 and color information of the object measured through the camera is 255 and when the illuminance value is approximately 200 and the color information of the object measured through the camera is 255, a brightness level of the object may vary.

In operation 650, the processor 220 may recognize a target object corresponding to the intent of the user among objects included in the output image acquired through the display.

For example, the processor 220 may recognize, as a target object, an object at which the user gazes for a specific period of time through gaze tracking according to a gaze direction of the user wearing the AR device 201 (e.g., directions in which pupils of user's right eye and left eye are gazing).

As another example, the processor 220 may track a hand of the user and a hand movement through the camera of the AR device 201 and, when the user performs a motion of selecting a specific object within the AR service image, may recognize the selected specific object as the target object.

In operation 660, the processor 220 may display, through the display, a first AR service image that includes at least one virtual object in association with the target object.

The processor 220 may recognize that the object is a specific thing as a result of object recognition within the image. For example, the image segmentation may output object recognition information from the image. For example, a form of input data (or learning data) of the image segmentation may be an image, and output data (or labeling data) may be object recognition information (or object classification information).

According to an embodiment, the processor 220 may generate a virtual object based on virtual object information related to object recognition information and may render and output the virtual object to overlap a real image near (or around) a target object or within a preset distance from the target object. For example, if the target object is a specific statue, the virtual object may be auxiliary user experience (UX) information that guides detailed information of the specific statue, but it is only an example and is not limited thereto.

In operation 670, the processor 220 may determine whether a first object exceeding a reference value is present near the target object or the virtual object by comparing the quantity of light of the target object, the virtual object, and objects. For example, the reference value has the range that is + by specific range based on a specific brightness value, and may vary depending on settings.

According to an embodiment, the reference value may increase or decrease depending on the distance from the target object.

According to an embodiment, the processor 220 may identify brightness matching between objects by comparing the brightness for each object, and may determine whether a bright object is present near the target object or/and the virtual object within the user's field of view or within a preset distance from the target object. According to an embodiment, the processor 220 may measure a glare index (e.g., UGR value) for each object recognized within the image by applying technology for measuring a glare index for a corresponding object (e.g., lighting) and may estimate the brightness (or brightness value).

According to an embodiment, the processor 220 may estimate the brightness (or brightness value) for each object recognized within the image based on technology for determining a camera exposure level. For example, the brightness may be in units of lumen (lm) or lux, but it is only an example and not limited thereto. In operation 680, when the first object exceeding the reference value is present near the target object or/and the virtual object, the processor 220 may control the display to decrease the light transmittance in an image area in which the first object is present.

According to an embodiment, the processor 220 may determine masking areas of both eyes corresponding to a location of the bright object within an image output through the display based on locations of both eyes of the user wearing the AR device 201. For example, referring to FIG. 5B, the processor 220 may identify locations of both eyes of the user wearing the AR device 201, may calculate binocular disparity (difference between right eye and left eye), and may determine a masking area when viewing the bright object 540. Since locations of images formed when viewing the bright object 540 at locations of both eyes of the user differ, the processor 220 may determine a location of the first masking area 560 corresponding to the eye that views through a first display and a location of the second masking area 561 corresponding to the eye that views through a second display. The processor 220 may decrease the light transmittance by controlling a voltage (or current) supplied to the first masking area 560 and the second masking area 561.

In operation 690, the processor 220 may display a second AR service image having the reduced transmittance in an area in which the first object is present.

When the user substantially views the bright object 540 through the display of the AR device 201, the user may perceive the brightness of the bright object 540 of which light transmittance is adjusted through the first masking area 560 and the second masking area 561. That is, in the user's field of view, the bright object 540 is not perceived as having the brightness exceeding the reference and the bright object 540 is viewed with a lower brightness value compared to <501>. Therefore, when viewing with eyes of the user, the glare phenomenon disappears, which makes it possible to provide the effect of more clearly recognizing the target object 520 and/or the virtual object 530.

When the first object exceeding the reference value is not present near the target object or/and the virtual object, the processor 220 may terminate the process of FIG. 6 or may perform operations 475 and 490 of FIG. 4 depending on cases.

A method of preventing, by an electronic device (e.g., electronic device 101 of FIG. 2, AR device 201 of FIGS. 2 and 3), glare of each object of an AR service image according to an embodiment may include acquiring a captured image from the camera in correspondence to a field of view of a user wearing the electronic device 101, 201. The method may include identifying the total quantity of light in an external environment through the illuminance sensor. The method may include recognizing objects included in a captured image acquired through the camera. The method may include determining the quantity of light for each recognized object based on the total quantity of light in the captured image and color information of the captured image acquired through the camera. The method may include recognizing a target object corresponding to the user intent among objects included in the acquired image. The method may include providing, through the transparent member and the display, the user with a first AR service image that includes at least one virtual object of which at least a portion overlaps the image in association with the recognized target object. The method may include comparing the quantity of light of the target object, the virtual object, and objects recognized in the image and determining whether a first object recognized as being in a glare state, exceeding a reference value, is present among objects located at a preset distance from the target object and/or the virtual object. The method may include displaying, through the display, a second AR service image having the reduced transmittance in at least a partial area of a corresponding transparent member when viewing the first object at locations of both eyes of the user through the transparent member and the display, based on the presence of the first object.

According to an embodiment, the recognizing the objects included within the image may include performing an image segmentation and recognizing objects included in the image.

According to an embodiment, the color information may include an RGB value of an image sensor corresponding to locations of objects recognized within the image.

According to an embodiment, the displaying the second AR service image having the reduced transmittance in at least a partial area of the corresponding transparent member when viewing the first object may include, when the first object is located within a preset distance from the target object or located within a preset distance from the virtual object, decreasing the transmittance in at least a partial area of a corresponding transparent member when viewing the first object, and, when the first object is the target object, increasing the brightness of the virtual object or when it is not possible to increase the brightness of the virtual object, decreasing the transmittance in at least a partial area of the corresponding transparent member when viewing the first object.

According to an embodiment, the recognizing the target object corresponding to the user intent may include recognizing an object at which the user gazes for a specific period of time as a target object, through gaze tracking according to a gaze direction of the user wearing the electronic device.

According to an embodiment, the recognizing the target object corresponding to the user intent may include tracking a hand of the user and a hand movement through the camera and when the user performs a motion of selecting a specific object within a first AR service image through the hand movement, recognizing the selected specific object as the target object.

According to an embodiment, the determining whether the first object recognized as being in the glare state is present may include measuring a glare index for each object recognized within the image using technology for measuring a glare index for an object included in the image and determining whether the first object is present based on the glare index.

According to an embodiment, the virtual object may be generated based on auxiliary user experience (UX) information that describes or guides the target object.

According to an embodiment, at least a partial area of the transparent member may include a corresponding first masking area when the user views the first object with the right eye and a corresponding second masking area when the user views the same with the left eye.

According to an embodiment, the displaying the second AR service image having the reduced transmittance in at least a partial area of the transparent member may further include, when a first object that exceeds a reference value is located around the target object or/and the virtual object, identifying locations of both eyes of the user wearing the electronic device, calculating binocular disparity and determining a corresponding first masking area when the user views the first object with the right eye and a corresponding second masking area when the user views the same with the left eye within the transmittance adjustment member, and decreasing the light transmittance by controlling a voltage or a current being supplied to the first masking area and the second masking area within the transmittance adjustment member.

In a computer-readable recording medium storing a program to execute a method of preventing, by the electronic device 101, 201, glare for each object of an AR service image, the method may include acquiring an image from a camera in correspondence to a field of view of a user wearing the electronic device, identifying the total quantity of light in an external environment through an illuminance sensor, recognizing objects included in a captured image acquired through the camera, determining the quantity of light for each recognized object based on the total quantity of light in the image and color information of the image acquired through the camera, recognizing a target object corresponding to the user intent among objects included in the image acquired through a display, displaying, through a transparent member and the display, a first AR service image that includes at least one virtual object of which at least a portion overlaps the image in association with the recognized target object, comparing the quantity of light of the target object, the virtual object, and objects recognized in the image and determining whether a first object recognized as being in a glare state, exceeding a reference value, is present among objects located at a preset distance from the target object and/or the virtual object, and displaying, through the transparent member and the display, a second AR service image having the reduced transmittance in at least a partial area of a corresponding transparent member when viewing the first object at locations of both eyes of the user, based on the presence of the first object.

The term "module" used in various embodiments of this document may include a unit implemented as hardware, software, or firmware, and may be interchangeably used with the terms, for example, logic, logic block, part, and circuit. The module may be an integrally configured part or a minimal unit of the part that performs one or more functions or a portion thereof. For example, according to an embodiment, the module may be implemented in a form of an application-specific integrated circuit (ASIC).

Various embodiments disclosed herein may be implemented as software (e.g., program 140) that includes one or more commands stored in a storage medium (e.g., internal memory 136 or external memory 138) readable by a machine (e.g., electronic device 101). For example, a processor (e.g., processor 120) of the machine (e.g., electronic device 101) may call and execute at least one command among the one or more commands stored in the storage medium, which enables the device to operate to perform at least one function in response to the called at least one command. The one or more commands may include a code generated by a compiler or a code executable by an interpreter. The storage medium readable by the device may be provided in the form of a non-transitory storage medium. Here, "non-transitory" simply indicates that the storage medium is a tangible device and does not include a signal (e.g., electromagnetic wave). This term does not distinguish a case in which data is semi-permanently stored in the storage medium from a case in which the data is transitorily stored in the storage medium.

According to an embodiment, the method according to various embodiments disclosed herein may be included in a computer program product and thereby provided. The computer program product may be traded between a seller and a purchaser. The computer program product may be distributed in a form of a storage medium readable by machine (e.g., compact disc read only memory (CD-ROM)) or may be distributed (e.g., downloaded or uploaded) directly or online through an application store (e.g., PlayStore™) or between two user devices (e.g., smartphones). In the case of online distribution, at least a portion of the computer program product may be at least transitorily stored or temporarily generated in a server of a manufacturer, a server of application store, or a storage medium readable by machine such as a memory of a repeater server.

According to various embodiments, a component (e.g., module or program) of each of the above-described components may include a singular object or a plurality of objects, and a portion of the plurality of objects may be separately provided by another component. According to various embodiments, one or more components among the above-described components or operations may be omitted, or one or more other components or operations may be added. Approximately or additionally, the plurality of components (e.g., modules or programs) may be integrated into one component. In this case, the integrated component may perform one or more functions of each of the plurality of components identically or similarly as being performed by a corresponding component among the plurality of components before the integration. According to various embodiments, operations performed by a module, a program, or another component may be executed sequentially, in parallel, repeatedly, or heuristically, or at least one of the operations may be executed in different order or omitted. Alternatively, one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
- a frame;
- a transparent member configured to be supported by the frame;
- a display configured to output visual information to the transparent member;
- a camera provided to the frame;
- an illuminance sensor;
- memory, comprising one or more storage media, storing instructions; and
- one or more processors communicatively coupled to the memory, the display, the camera, and the illuminance sensor,
- wherein the instructions, when executed by the one or more processors individually or collectively, cause the electronic device to:
  - acquire a captured image from the camera,
  - identify a total quantity of light in an external environment through the illuminance sensor,
  - recognize objects included in the captured image,
  - determine a quantity of light for each of the recognized objects based on the total quantity of light in the captured image and color information of the captured image acquired through the camera,
  - recognize a target object corresponding to a user gaze direction among objects included in the acquired captured image,
  - output, through the transparent member and the display, a first augmented reality (AR) service image that includes at least one virtual object of which at least a portion overlaps the captured image in association with the recognized target object, and
  - display, through the display, a second AR service image having a reduced transmittance in at least a partial area of a transparent member corresponding to a first object at locations of both eyes of the user, when the first object is recognized as being in a glare state, exceeding a reference value, is present among objects located at a preset distance from the target object and/or the virtual object by comparing the quantity of light of the target object, the virtual object, and the objects recognized in the image.

2. The electronic device of claim 1, wherein the instructions, when executed by the one or more processors individually or collectively, further cause the electronic device to perform an image segmentation and to recognize objects included in the captured image.

3. The electronic device of claim 1, wherein the color information includes a red, green, blue (RGB) value of an image sensor corresponding to locations of objects recognized within the captured image.

4. The electronic device of claim 1, wherein the instructions, when executed by the one or more processors individually or collectively, further cause the electronic device to recognize, as the target object, an object at which the user gazes for a specific period of time through gaze tracking according to a gaze direction of the user wearing the electronic device.

5. The electronic device of claim 1, wherein the instructions, when executed by the one or more processors individually or collectively, further cause the electronic device to:

when the first object is located within a preset distance from the target object or located within a preset distance from the virtual object, decrease a transmittance in at least a partial area of a transparent member corresponding to the first object at locations of both eyes of the user; and when the first object is the target object, increase a brightness of the virtual object, or when it is not possible to increase the brightness of the virtual object, decrease the transmittance in at least a partial area of the transparent member corresponding to the first object at locations of both eyes of the user.

6. The electronic device of claim 1, wherein the instructions, when executed by the one or more processors individually or collectively, further cause the electronic device to track a hand of the user and a hand movement through the camera, and when the user performs a motion of selecting a specific object within a first AR service image through the hand movement, recognize the selected specific object as the target object.

7. The electronic device of claim 2, wherein the instructions, when executed by the one or more processors individually or collectively, further cause the electronic device to:

acquire object recognition information or object classification information as a result of performing the image segmentation; and generate the virtual object based on the object recognition information.

8. The electronic device of claim 1, wherein the virtual object is generated based on auxiliary user experience (UX) information that describes or guides the target object.

9. The electronic device of claim 1, wherein the instructions, when executed by the one or more processors individually or collectively, further cause the electronic device to:

measure a glare index for each object recognized within the captured image using technology for measuring a glare index for an object included in the captured image; and determine whether the first object is present based on the glare index.

10. The electronic device of claim 1, wherein at least a portion of the transparent member or the display includes a transmittance adjustment member, and wherein the instructions, when executed by the one or more processors individually or collectively, further cause the electronic device to:

when a first object that exceeds a reference value is located around the target object or/and the virtual object, identify locations of both eyes of the user wearing the electronic device, calculate binocular disparity, and determine a corresponding first masking area when the user views the first object with a right eye and a corresponding second masking area when the user views the same with a left eye within the transmittance adjustment member, and decrease a light transmittance by controlling a voltage or a current being supplied to the first masking area and the second masking area within the transmittance adjustment member.

11. A method of preventing, by an electronic device, glare for each object of an augmented reality (AR) service image, the method comprising:

acquiring a captured image from a camera;

identifying a total quantity of light in an external environment through an illuminance sensor;

recognizing objects included in the captured image;

determining a quantity of light for each of the recognized objects based on the total quantity of light in the captured image and color information of the captured image acquired through the camera;

recognizing a target object corresponding to a user gaze direction among objects included in the captured image;

outputting, through a transparent member and a display, a first augmented reality (AR) service image that includes at least one virtual object of which at least a portion overlaps the captured image in association with the recognized target object; and displaying a second AR service image having a reduced transmittance in at least a partial area of a corresponding transparent member when viewing a first object at locations of both eyes of the user, when a first object recognized as being in a glare state, exceeding a reference value, is present among objects located at a preset distance from the target object and/or the virtual object by comparing the quantity of light of the target object, the virtual object, and the objects recognized in the image.

12. The method of claim 11, wherein the recognizing the target object corresponding to the user gaze direction comprises recognizing, as the target object, an object at which the user gazes for a specific period of time through gaze tracking according to a gaze direction of the user wearing the electronic device, and wherein the displaying the second AR service image having the reduced transmittance in at least a partial area of the corresponding transparent member when viewing the first object comprises:

when the first object is located within a preset distance from the target object or located within a preset distance from the virtual object, decreasing a transmittance in at least a partial area of a transparent member corresponding to the first object at locations of both eyes of the user, and when the first object is the target object, increasing a brightness of the virtual object, or when it is not possible to increase the brightness of the virtual object, decreasing the transmittance in at least a partial area of the transparent member corresponding to the first object at locations of both eyes of the user.

13. The method of claim 11, wherein the recognizing the target object corresponding to the user gaze direction comprises tracking a hand of the user and a hand movement through the camera, and when the user performs a motion of selecting a specific object within a first AR service image through the hand movement, recognizing the selected specific object as the target object.

14. The method of claim 11, wherein the determining whether the first object recognized as being in the glare state is present comprises measuring a glare index for each object recognized within the captured image using technology for measuring a glare index for an object included in the captured image, and determining whether the first object is present based on the glare index.

15. The method of claim 11, wherein the color information includes a red, green, blue (RGB) value of an image sensor corresponding to locations of objects recognized within the captured image.

16. The method of claim 11, wherein the recognizing of the target object comprises:

performing an image segmentation and recognizing objects included in the captured image.

17. The method of claim 11, wherein the virtual object is generated based on auxiliary user experience (UX) information that describes or guides the target object.

18. One or more non-transitory computer-readable storage media storing one or more computer programs including computer-executable instructions that, when executed by one or more processors of an electronic device individually or collectively, cause the electronic device to perform operations, the operations comprising:

acquiring a captured image from a camera of an electronic device;

identifying a total quantity of light in an external environment through an illuminance sensor;

recognizing objects included in the captured image;

determining a quantity of light for each of the recognized objects based on the total quantity of light in the captured image and color information of the captured image acquired through the camera;

recognizing a target object corresponding to a user gaze direction among objects included in the captured image;

outputting, through a transparent member and a display, a first AR service image that includes at least one virtual object of which at least a portion overlaps the captured image in association with the recognized target object; and displaying a second AR service image having a reduced transmittance in at least a partial area of a corresponding transparent member when viewing a first object at locations of both eyes of the user, when a first object recognized as being in a glare state, exceeding a reference value, is present among objects located at a preset distance from the target object and/or the virtual object by comparing the quantity of light of the target object, the virtual object, and the objects recognized in the image.

19. The one or more non-transitory computer-readable storage media of claim 18, wherein the color information includes a red, green, blue (RGB) value of an image sensor corresponding to locations of objects recognized within the captured image.

* * * * *